March 10, 1942.   C. W. BONDURANT   2,275,605
SECURING DEVICE FOR THERMOSTATS
Filed July 1, 1939
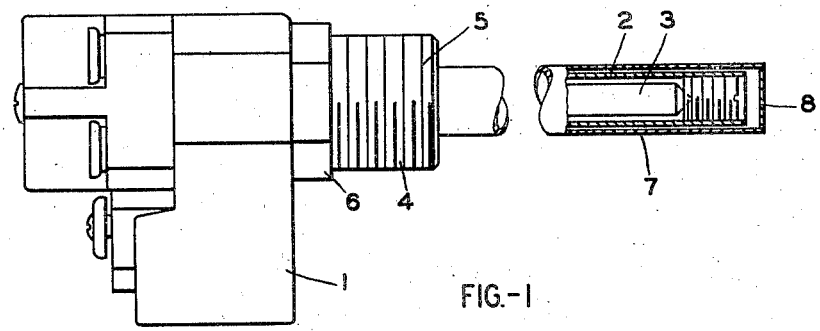
FIG.-1
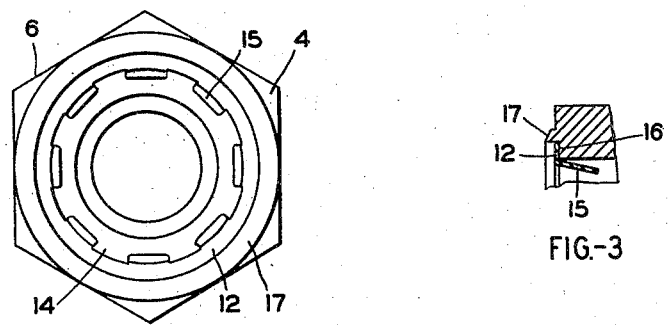
FIG.-2
FIG.-3
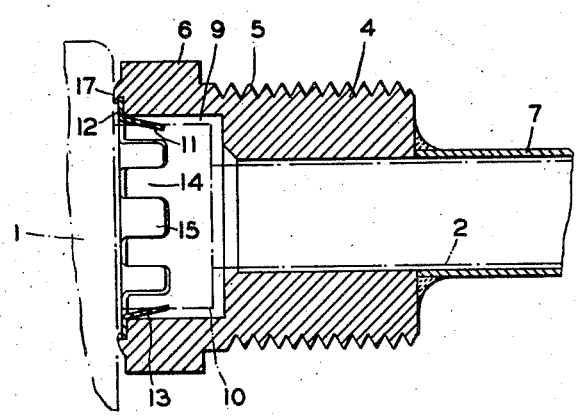
FIG.-4
INVENTOR
CARLTON W. BONDURANT
BY Hyde, Higley & Meyer
ATTORNEYS Patented Mar. 10, 1942

2,275,605

UNITED STATES PATENT OFFICE 2,275,605

SECURING DEVICE FOR THERMOSTATS

Carlton W. Bondurant, Euclid, Ohio, assignor to The Titan Valve and Manufacturing Company, Cleveland, Ohio, a corporation of Ohio Application July 1, 1939, Serial No. 282,404

1 Claim. (Cl. 287—20)

This invention relates to securing devices for thermostats.

The ordinary thermostatic regulator, such as is used for controlling the temperature of water in domestic hot water heating apparatus, is inserted into and supported in a hollow holder threaded into the water tank and designed to enclose and protect the thermostat from contact with the water.

The present invention has for its object to provide such holders with simple and improved means for removably securing the thermostat therein and more particularly, to holding or securing means of frictional clamping form designed to hold the thermostat firmly in position but to permit it to be readily adjusted rotatably or to be removed, whenever necessary.

Further objects of the invention are in part obvious and in part will appear more in detail hereinafter.

In the drawing Fig. 1 represents a view, partly in elevation and partly in longitudinal section, showing one suitable embodiment of the invention;

Fig. 2 is an end elevation of the supporting holder; and

Figs. 3 and 4 are longitudinal sectional elevations, corresponding to Fig. 1, but on a larger scale, illustrating the manner of securement of the securing device in the holder.

Referring to Fig. 1, I conventionally illustrates the casing or body of any suitable thermostat for the control of temperature. It may control, for example, the flow of gas to a heating burner, in which case the body I contains lever or other mechanism, usually of snap action type, forming an operating connection between the elements of the thermostatic couple and the gas valve. Such mechanism, for example, may be of the form shown in Patent No. 2,161,773, for Thermostatic valve mechanism, granted June 6, 1939, to Joseph A. Cerny.

In other cases the thermostatic elements may control switches or contacts in circuits to an electric heater, in which case the hollow body I will contain similar snap action or other lever mechanism forming a connection between the elements of the thermostatic couple and said switch mechanism or contacts, as illustrated, for example, in my prior application for Thermostatically operated switch mechanism, Serial No. 270,331, filed April 27, 1939, now Patent No. 2,221,907, to which reference may be had for a more complete description if desirable or necessary.

In any event, whether the part to be controlled is a valve, or an electric switch, or any other controlling device, the thermostatic elements usually include a tubular member 2, made of a material having a high coefficient of expansion, such as brass or copper, within which is located the other element of the couple, made of a material having a relatively low coefficient of expansion, such as porcelain, steel or the like, and usually in the form of a rod 3.

The holder for the thermostat comprises a body portion 4 externally threaded as at 5 so that it may be screwed into a fitting on the hot water tank, and usually also having a wrench hold such as the hex portion 6. Extending longitudinally from the body portion, and either integral therewith or permanently attached thereto, as by soldering or brazing, is a hollow tube or casing 7 closed at its inner end, as at 8, and which tube is designed to receive the tube 2 of the thermostat, the body portion 5 having an enlarged recess 9 adapted to receive a boss 10 of the thermostat in the usual manner.

Usually, in the use of such thermostats, means is provided for detachably connecting or securing the thermostat to the holder after it is inserted therein, such as the set screw shown for the purpose in Fig. 1 of my prior application referred to, or, means external to the thermostat and said holder may be employed for the purpose, such as a part fastened to the thermostat and designed to grip or hold the external hex portion of the holder. Such devices are unsatisfactory for many reasons, usually because they require tools for manipulation and the attachment of extra loose parts.

According to my invention I form the cavity 9 of the holder somewhat larger in diameter than the boss 10 of the thermostat which it receives, and in the space between the thermostat boss and the wall of the holder I insert spring means for clamping and holding the thermostat in place. As illustrated more clearly in Fig. 4, the clamping device comprises a thimble 11 made of fairly strong resilient material, such as spring brass or the like. Said thimble is provided with an outer washer-like plain wall or flange 12 extending outwardly from one end of a generally cylindrical portion 13 slotted longitudinally at a plurality of points, such as at 14, to form a series of longitudinally extending tongues 15 which are bent inwardly so that the pronged portion of the thimble is slightly conical in form, the diameter of the thimble, across the ends of the prongs, being slightly less than the external diameter of the boss 10.

To firmly and permanently secure the thimble in place, the body 5 of the holder is initially formed with a shallow countersunk portion 16, and on its end with a very small rib 17 shown somewhat exaggerated in Fig. 3. The circular washer-like portion of the thimble is a close fit within the countersunk recess. It is pushed into place, in the manner shown in Fig. 3, and thereupon a spinning tool is applied to the crest of the rib 17 and run around the same, by rotation of either the work or the tool, so as to spin the metal down and over the edge of the disc, in the manner shown in Fig. 4. The bead thus spun over the disc edge is quite minute, its depth being measured in thirty-seconds or sixty-fourths of an inch, and the metal is spun inwardly over the edge of the disc only a matter of a few thousandths. But even the slightest inward spinning of such metal permanently anchors the thimble in place.

With the holder thus formed it is inserted into the tank or boiler in the usual manner and the thermostat is pushed endwise into place, with its tube 2 entering the support tube 7 and its boss 10 pressed into place within the pronged portion of the thimble, pressing its prongs outwardly as the boss moves to home position. Fig. 1 illustrates the final position of the parts, in which the thermostat is frictionally held against rotation and against accidental endwise displacement, but permitting it to be readily turned or pulled out with the fingers, when desirable or necessary.

The arrangement of course is of particular advantage in connection with electrical thermostats where the only outside attachment to the thermostat is by way of the circuit wires, which are flexible and do not offer solid support for the thermostat, as distinguished from the support offered by the pipes connected to a gas valve thermostat. But, nevertheless, the invention is useful in connection even with valve type thermostats for holding the parts in place while making connections and at other times, such as when the support and the thermostat are shipped or stored or boxed together, or as a unit, before installation.

Other advantages of the invention will be apparent to those skilled in the art.

What I claim is:

Thermostat supporting means including a chambered body member externally threaded for attachment to a container and provided with a noncircular wrench-receiving portion, yieldable holding means permanently secured to said member and arranged to frictionally engage a thermostat extending into its chamber, said means comprising a thimble having a flange, said member having an annular rib spun over said flange to permanently anchor it in place, and said thimble having a skirt slotted to provide resilient holding fingers adapted to engage a thermostat in said chambered body.

CARLTON W. BONDURANT.